(12) United States Patent
Ouzounov (10) Patent No.: US 9,941,980 B2
(45) Date of Patent: Apr. 10, 2018

(54) BODY COUPLED COMMUNICATION DEVICE WITH SYNCHRONIZATION

(71) Applicant: KONINKLIJKE PHILIPS N.V., Eindhoven (NL)

(72) Inventor: Sotir Filipov Ouzounov, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/311,317

(22) PCT Filed: May 5, 2015

(86) PCT No.: PCT/EP2015/059869
§ 371 (c)(1),
(2) Date: Nov. 15, 2016

(87) PCT Pub. No.: WO2015/180937
PCT Pub. Date: Dec. 3, 2015

(65) Prior Publication Data
US 2017/0111123 A1    Apr. 20, 2017

(30) Foreign Application Priority Data
May 27, 2014 (EP) .................................. 14170007

(51) Int. Cl.
*H04B 5/00* (2006.01)
*H04B 13/00* (2006.01)
*H04L 29/08* (2006.01)

(52) U.S. Cl.
CPC ......... *H04B 13/005* (2013.01); *H04B 5/0031* (2013.01); *H04L 67/12* (2013.01)

(58) Field of Classification Search
CPC ...................................................... H04B 5/00
See application file for complete search history.

(56) References Cited

U.S. PATENT DOCUMENTS 6,434,187 B1 *  8/2002  Beard .................... H04B 1/403
                                                       332/128
6,812,824 B1 * 11/2004  Goldinger .............. G06K 17/00
                                                       340/10.1
(Continued)

FOREIGN PATENT DOCUMENTS

JP       3297234 A    12/1991
JP    H03297234 A    12/1991
(Continued)

OTHER PUBLICATIONS

El-Hoiydi A. et al, "WiseMAC, an Ultra Low Power MAC Protocol for the WiseNET Wireless Sensor Network", SenSys '03 Proceedings of the 1st International Conference on Embedded Networked Sensor Systems, pp. 302-303, ACM New York, NY, USA ©2003.
(Continued)

*Primary Examiner* — Cindy Trandai
(74) *Attorney, Agent, or Firm* — Larry Liberchuk (57) ABSTRACT

A body-coupled communication device (201) adapted to receive signals via a body transmission channel (160), the first device comprising couplers (102) arranged to receive a body-coupled signal, a synchronization-indicator (272) to storing a level of synchronization between the first device and a second device, and a band-pass filter (250) arranged to filter the received body-coupled signal depending on the synchronization level, the band-pass filter being arranged to allow passage of frequencies in a frequency-interval around a tunable filter frequency, wherein the frequency-interval is narrow if the synchronization-level is high and wherein the frequency-interval is broad if the synchronization-level is low.

13 Claims, 6 Drawing Sheets

(56) References Cited

U.S. PATENT DOCUMENTS

| | | | | |
|---|---|---|---|---|
| 7,277,457 B2* | 10/2007 | Gorday | ............ | H04L 7/04 370/480 |
| 8,059,628 B2* | 11/2011 | Bradley | ............ | A61N 1/37276 128/903 |
| 8,108,044 B2* | 1/2012 | Le Reverend | ..... | A61N 1/37276 607/32 |
| 8,208,391 B2* | 6/2012 | Gurney | ............ | H04W 52/0229 370/252 |
| 8,554,333 B2* | 10/2013 | Wu | ............ | 340/10.33 |
| 8,811,547 B2* | 8/2014 | Fazzi | ............ | H04B 13/005 375/343 |
| 2005/0216070 A1* | 9/2005 | Boveja | ............ | A61N 1/08 607/46 |
| 2007/0055324 A1* | 3/2007 | Thompson | ............ | A61N 1/37252 607/60 |
| 2009/0109885 A1* | 4/2009 | Fonseca, Jr. | ............ | H04L 1/1825 370/311 |
| 2010/0172394 A1 | 7/2010 | Lim | | |
| 2011/0046698 A1* | 2/2011 | Kivi | ............ | H04W 76/028 607/60 |
| 2011/0200150 A1 | 8/2011 | Fazzzi | | |
| 2011/0299512 A1* | 12/2011 | Fukuda | ............ | G06F 1/163 370/338 |
| 2012/0033584 A1 | 2/2012 | Corroy | | |
| 2012/0286927 A1* | 11/2012 | Hagl | ............ | G07C 9/00309 340/5.61 |
| 2015/0128711 A1* | 5/2015 | Ismail | ............ | G01H 1/00 73/652 |
| 2015/0271753 A1* | 9/2015 | Matsuda | ............ | H04W 52/0219 370/311 |
| 2016/0366643 A1* | 12/2016 | Gustafsson | ............ | H04Q 9/00 |

FOREIGN PATENT DOCUMENTS

| | | |
|---|---|---|
| WO | WO2006035351 A2 | 4/2006 |
| WO | WO2006054211 A1 | 5/2006 |
| WO | WO2007084807 A1 | 7/2007 |
| WO | WO2007096810 A1 | 8/2007 |
| WO | WO2009038352 A1 | 3/2009 |
| WO | WO2010049842 A1 | 5/2010 |
| WO | WO2010126342 A2 | 11/2010 |
| WO | WO2011033430 A1 | 3/2011 |
| WO | WO2014161912 A1 | 10/2014 |

OTHER PUBLICATIONS

Li H. et al., "An Ultra-Low-Power Medium Access Control Protocol for Body Sensor Network", Department of Electrical and Computer Engineering Michigan Technological University, 2005 IEEE.

* cited by examiner

BODY COUPLED COMMUNICATION DEVICE WITH SYNCHRONIZATION

FIELD OF THE INVENTION

The invention relates to a body-coupled communication device adapted to receive signals via a body transmission channel and to a body-coupled communication device adapted to send signals via a body transmission channel.

The invention further relates to body-coupled communication system, a body-coupled communication method adapted to receive signals, and a body-coupled communication second method adapted to send signals.

BACKGROUND

Body-coupled communications (BCC) or body-based communication has been proposed as a promising alternative to radio frequency (RF) communication as a basis for body area networks (BANs) as standardized by the 802.15.6 Task Group of the Institute of Electrical and Electronics Engineers (IEEE). BCC allows exchange of information between a plurality of devices which are at or in close proximity of a body of a human or an animal. This can be achieved by capacitive or galvanic coupling of low-energy electric fields onto the body surface.

In capacitive body coupled communication (BCC) systems information is transmitted from a transmission device to a receiver device via capacitive coupled signals over the user body. Body coupled communication utilizes an electric field rather than an electromagnetic field to transmit information. Capacitive coupling the signal from a small body-worn tag into your body, it generates a minute yet detectable electric field that extends outwardly a couple of centimeters from the entire surface of your skin.

Body coupled communication (BCC) uses the human body as communication channel. It enables wireless communication over a human body between devices that are in contact with that human body. Signals are conveyed over the body instead of through the air. As such, the communication is confined to an area close to the body in contrast to RF communications, where a much larger area is covered. Therefore, communication is possible between devices situated on, connected to, or placed close to the body. Moreover, since lower frequencies can be applied then is typical in RF-based low range communications, it opens the door to low-cost and low-power implementations of BANs or personal area networks (PANs). Hence, the human body is exploited as a communication channel, so that communication can take place with much lower power consumption than in standard radio systems commonly used for BANs (e.g. ZigBee or Bluetooth systems). Since BCC is usually applied in close proximity to the body, it can be used to realize new and intuitive body-device interfaces based on contact or proximity. This creates possibilities for many applications in the field of identification and security.

BCC can be technically realized by electric fields that are generated by a small body-worn tag, e.g., being integrated to a credit card or another suitable device attached to or worn in close proximity to the body. This tag capacitively or galvanically couples a low-power signal to the body. Sometimes this body-coupled communication is referred to as "near-field intra-body communication". BCC is a wireless technology that allows electronic devices on and near the human body to exchange digital information through capacitive or galvanic coupling via the human body itself. Information is transmitted by modulating electric fields and either capacitively or galvanically coupling tiny currents onto the body. The body conducts the tiny signal to body mounted receivers. The environment (the air and/or earth ground) provides a return path for the transmitted signal.

Figure 1:
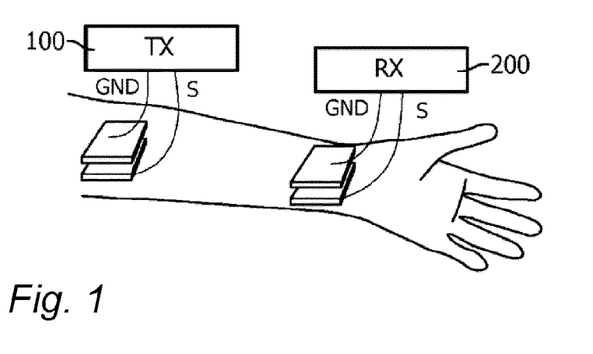
FIG. 1 shows a schematic electrode arrangement of a BCC system.

FIG. 1 shows an exemplary body communication system structure, where data signals are transmitted via couplers placed near or on the body. These couplers transfer the data signal, either galvanically or capacitively, to the body. In the example of FIG. 1, one coupler or electrode provides ground potential GND and the other coupler or electrode is used for transmitting/receiving a signal S. More specifically, transmission from a transmitter (TX) 100 to a receiver (RX) 200 over a human arm is depicted. Generally, every node can in principle act both as transmitter and receiver, i.e., as a transceiver (TRX), and communication can take place from everywhere on the body.

A communication protocol, such as the Medium Access Control (MAC) protocol, coordinates transmission-related actions over shared channels and may comprise a synchronous mode, supporting priority driven bandwidth allocations, and an asynchronous mode. The asynchronous mode is intended primarily to support ultra low power operation. In this mode the devices spend most of their time sleeping, potentially resulting in long operational life even from a small form factor battery. Devices periodically listen to the medium according to their wake up schedule.

A. El-Hoiydi et al, "WiseMAC, an Ultra Low Power MAC Protocol for the WiseNET Wireless Sensor Network", SenSys '03, Nov. 5-7, 2003, Los Angeles, Calif., USA, describes preamble sampling for the receiver side, which consists in regularly sampling the medium to check for activity. In this context, sampling the medium is intended to mean listening to the radio channel for a short duration, e.g., the duration of a modulation symbol. In a network, all nodes sample the medium with the same constant period, independently of the actual traffic. Their relative sampling schedule offsets are independent. If the medium is found busy, the receiver continues to listen until a data packet is received or until the medium becomes idle again. At the transmitter, an extended period of preamble is transmitted in front of every message to ensure that the receiver will be awake when the data portion of the message will arrive. The preamble introduces a power consumption overhead both in transmission and in reception. To minimize this overhead, sensor nodes learn the offset between the sampling schedule of their direct neighbors and their own one. Knowing the sampling schedule of the destination, sensor nodes send messages at just the right time with a preamble of minimized length.

WO/2011/033430 discloses asynchronous transmission with double wake up. A receiver turning on during a sequence of wake up commands and not detecting the wake up commands, can be sure to successfully detect a preamble if it tries again a second time a set interval later.

Nevertheless, power-usage of body-coupled communication devices remains a concern.

SUMMARY OF THE INVENTION

It would be advantageous to have an improved body-coupled communication device; for example a body-coupled communication device with reduced power-consumption, especially when in stand-by mode, or with a reduced number of false wake-ups.

A first body-coupled communication device is presented, adapted to receive signals via a body transmission channel. The first device comprises couplers, a synchronization-indicator, and a band-pass filter.

The couplers are arranged to receive a body-coupled signal from at least a second body-coupled communication device over the body transmission channel, the body transmission channel being formed by a body of a user when the body is in the direct vicinity of the couplers. The synchronization-indicator is arranged to store a level of synchronization between the first device and the second device. The band-pass filter is arranged to filter the received body-coupled signal depending on the synchronization level, the band-pass filter being arranged to allow passage of frequencies in a frequency-interval around a tunable filter frequency, wherein the frequency-interval is narrow if the synchronization-level is high and wherein the frequency-interval is broad if the synchronization-level is low.

The first body-coupled communication device may further comprise a detection-circuit, and tuning circuit. The detection-circuit is arranged to detect an external synchronization signal in the filtered body-coupled signal. The tuning circuit is arranged to tune the tunable filter frequency towards a frequency of the detected synchronization signal, and arranged to increase the synchronization-level.

Due to process variation a signal generation circuit on a second device, e.g., that generates the synchronization signal and band-pass filter on a second device may be ill synchronized. Even if the generation and filter are set to a particular frequency, this actual frequency that is obtained may vary substantially. Existing solutions to synchronize frequencies across different devices use crystals. However, crystals are expensive. By sending a synchronization signal the band-pass filter can be reliably tuned. At that point also its frequency interval may be reduces since variations are reduced.

Indeed, it would be advantageous to configure the device to operate in stand-by mode, and to wake the device upon detecting of a wake-up signal received on the couplers. It would be advantageous to have the filtering narrow as this would reduce power consumption. However, when the pass-band would be too narrow, genuine wake-up signals may be missed. This problem is address by a synchronization-indicator arranged to store a level of synchronization between the first device and the second device. As the band-pass filter of the first device is better synchronized with wake-up signals sent by the second device, the filtering may become narrower. The first and second device may use dedicated synchronization signals to improve synchronization, the synchronization signals may also be the wake-up signals themselves.

The low power consumption has the advantage that less noise needs to be overcome in a narrow band; and improves the possibility to detect smaller signals. This in turn allows one to use less power for transmission.

Instead of using a synchronization or wake-up signal, a VCO of the first device may be synchronized to a data transmission of the second device. The synchronized VCO may then be used to synchronize the band-pass filter. In both cases, the synchronization-indicator indicates the level of synchronization of the band-pass filter to the second device, e.g., a frequency configuration of the second device.

In an embodiment, the first body-coupled communication device comprises a wake-up circuit which is separate from the main receiver. This allows the wake-up circuit to be very low-power. For example, the synchronization-indicator, band-pass filter, and detector may be part of the wake-up circuit.

In an embodiment, the first device comprises an electronic oscillator arranged to generate a clock signal, and a synchronization circuit arranged to synchronize the oscillator of the first device with the second device. Not only the tuning of the band-pass filter may be improved, also the clock speed may be better tuned. This in turn leads to the generation and transmission of signals by the first device that can be better received by the second device, in particular wake-up signals.

The second device may comprise couplers arranged to transmit a body-coupled signal to one or more first devices over the body transmission channel, the body transmission channel being formed by a body of a user when the body is in the direct vicinity of the couplers, and a signal generator arranged to generate an external synchronization signal having the synchronization frequency and to transmit the synchronization signal to the first device.

An aspect of the invention concerns a body coupled network comprising a second device and at least one first device.

In an embodiment, the first and second devices synchronize their band-pass filters to the same physical signal. For example, in an embodiment of the second body-coupled communication device adapted to send signals via a body transmission channel, the second device comprises couplers, a band-pass filter, a signal generator, and a tuning circuit.

The couplers are arranged to transmit a body-coupled signal to one or more first body-coupled communication devices over the body transmission channel, the body transmission channel being formed by a body of a user when the body is in the direct vicinity of the couplers.

The band-pass filter is arranged to filter the received body-coupled signal, the band-pass filter being arranged to allow passage of frequencies in a frequency-interval around a tunable filter frequency.

The signal generator is arranged to generate an external synchronization signal having the synchronization frequency.

The tuning circuit is arranged to tune the tunable filter frequency of the band-pass filter towards a frequency of a synchronization signal locally generated by the signal generator of the second device.

Synchronizing a band-pass filter to a synchronization signal that was produced form a clock reduces the effect of process variation between manufacture of the clock and the filter. Wake-up is improved and power-consumption is reduced.

The first and second devices are electronic devices. The second device may be, in particular, a mobile electronic device, such as a mobile phone or a mobile computer like a tablet.

In an embodiment the second device is a watch or a smart-phone. The smart phone may be configured to send periodic wake-up signal to the first devices, so that when a user touches the smart phone the first devices are woken. The first devices may send data when woken. The first device may be configured to sleep after being one for some pre-determined time.

The first and second devices described herein may be applied in a wide range of practical applications. For example, BCC devices may be worn on or close to the body and may be are used to collect and exchange information between each other and to form body area networks. For example, an ID tag, which is easily built into something as small and unobtrusive as a wristband, may modulate this electric field with a unique digital identification code. Authorized devices that come close to your skin can pick up this identification code over BCC and configure themselves to your specific personal profile, while authentication mechanisms between the tag and the device protect your privacy and security. For in-home patient monitoring systems it could mean body sensors that use your identity information to automatically configure themselves to monitor specific medical conditions, but it could just as easily be mobile phones or MP3 players that automatically configure themselves to your personal tastes and preferences the instant you pick them up. The first and second device can be used in all types of BCC applications.

In an embodiment, a first device may send sensor data, such a heart rate data, temperature data, and the like to a second device.

There is provided a body-coupled communication device adapted to receive signals via a body transmission channel, the first device comprising couplers arranged to receive a body-coupled signal, a synchronization-indicator to store a level of synchronization between the first device and a second device, and a band-pass filter arranged to filter the received body-coupled signal depending on the synchronization level, the band-pass filter being arranged to allow passage of frequencies in a frequency-interval around a tunable filter frequency, wherein the frequency-interval is narrow if the synchronization-level is high and wherein the frequency-interval is broad if the synchronization-level is low.

BRIEF DESCRIPTION OF THE DRAWINGS

These and other aspects of the invention are apparent from and will be elucidated with reference to the embodiments described hereinafter. In the drawings.

Items which have the same reference numbers in different figures, have the same structural features and the same functions, or are the same signals. Where the function and/or structure of such an item has been explained, there is no necessity for repeated explanation thereof in the detailed description.

LIST OF REFERENCE NUMERALS 100 a first body coupled communication device
102 couplers
104 metal plates
106 a main receiver
107 an internal wake-up signal
108 a wake-up receiver
150 a body of a user
160 a body transmission channel
180 a second body coupled communication device
190 a body coupled communication system
200, 201 a first body coupled communication device
210 a main transmitter
220 a wake-up signal generator
230 an oscillator
240 a synchronization circuit
250 a band-pass filter
260 a detection circuit
270 a parameter store
272 a synchronization-indicator
280 a tuning circuit
301,302 a data packet
303 a synchronization packet
310 a preamble
315 a wake-up-signal
320 a start of packet
330 a data payload
340 an end of packet
352 a synchronization wake-up
354 synchronization identifier
356 a synchronization signal
360 a signal path
361 an amplifier
362 a band-pass filter
363 a rectifier
364 an integrator
365 a comparator
400,401 a second body coupled communication device
420 a signal generator
430 an oscillator

DETAILED DESCRIPTION OF EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

FIG. 1 shows a schematic electrode arrangement of a BCC system, as discussed above. The plates may be orientated parallel to each other and to the skin of the body where the plates are applied; this arrangement is shown in the figure. This arrangement is not necessary; the plates may also be arranged parallel to the skin, but side by side, both plates being in the direct vicinity of the skin.

Figure 2:
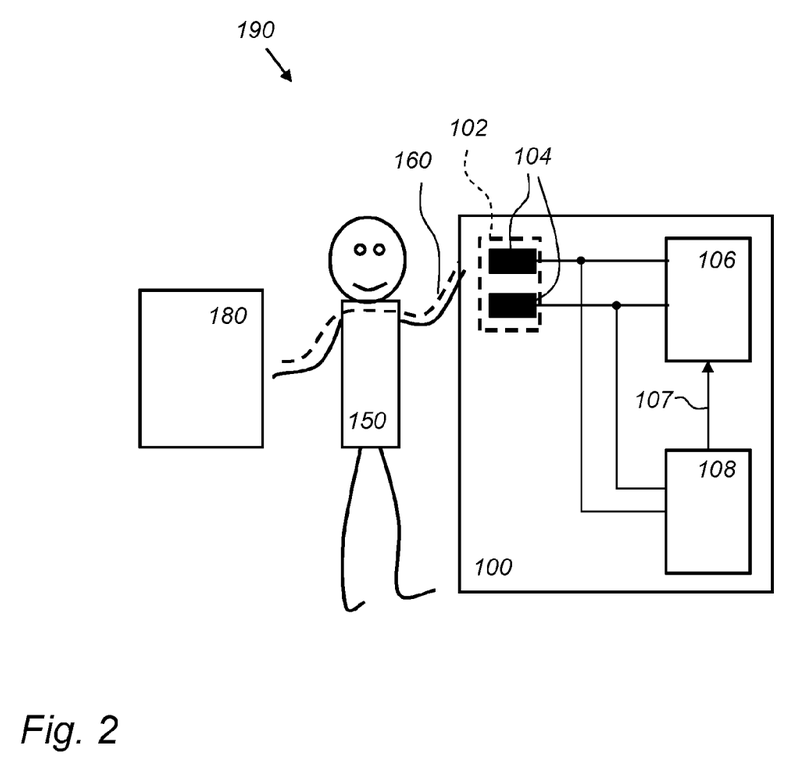
FIG. 2 shows a body coupled communication system 190.

FIG. 2 discloses a body coupled communication system 190, in which the invention may be applied. FIG. 2 schematically shows an embodiment of a body coupled communication system 190 comprising a first body coupled communication device 100 and a second body coupled communication device 180. As well as the first body coupled communication device 100 and the second body coupled communication device 180 are configured to communicate signals and data via a body transmission channel 160 which is formed by the body of a user 150. The first body coupled communication device 100 and the second body coupled communication device 180 are able to communicate via the body transmission channel when couplers of the respective devices is in the direct vicinity of the body of the user. Direct vicinity of the body of the user means that the couplers and the body are within a maximum distance of each other to allow the exchange of signals via the body of the user. Optionally, the maximum distance (of the direct vicinity) is closer than 10 cm, or closer than 5 cm. Optionally, the maximum distance is closer than 2 cm. In an optional embodiment of the invention, direct vicinity means that the user touches the respective couplers of the first body coupled communication device 100 and a second body coupled communication device 180. It is to be noted that the communication is only possible when both devices are simultaneously in the direct vicinity of the body of the user.

The first body coupled communication device 100 is capable of receiving signals, data, and information via the body transmission channel 160. For example, device 100 may comprise couplers 102 for receiving signals from the body transmission channel when the body is in the direct vicinity of the couplers 102. In an embodiment, the couplers 102 comprise two plates 104 which form two poles of the couplers 102. Plates 104 of electrically conductive, e.g., made of metal. The first body coupled communication device 100 further comprises a main receiver 106 which is coupled to the couplers 102 and further comprises a wake-up receiver 108 which is also coupled to the couplers 102. Wake-up receiver 108 is an example of a detection circuit.

The main receiver 106 is configured to operate in an operational mode and to operate in a sleep mode. In the sleep mode most circuitries of the main receiver 106 are switched off and do not use power. In the sleep mode the main receiver 106 is only able to detect whether it receives a internal wake-up signal 107 and when it receives the internal wake-up signal 107, the main receiver 106 is configured into the operational mode in which the main receiver 106 is fully operational to receive signals, and, thus, data and information via the body transmission channel 160. In an optional embodiment, the main receiver 106 comprises means to detect lack of communication activities via the body transmission channel. For example, such means generates a sleep signal when during a predetermined period of time no signals are transmitted via the body transmission channel 160 and the main receiver 106 is configured into the sleep mode when the sleep signal is generated. The main receiver 106 may further be configured to synchronize to signals received via the body transmission channel 160 and to demodulate the received signals. The demodulated signals may be provided to other circuits (not shown) of the first body coupled communication device 100, such as, for example, a processing unit.

The wake-up receiver 108 receives the signals that are intercepted by the couplers 102. The signals of the couplers 102 are filtered by a band-pass filter (not shown) to obtain a filtered signal. The band-pass filter only allows the passage of signals in a particular predefined spectral range and attenuates signals outside this predefined spectral range. The predefined spectral range is related to frequencies of external wake-up signals that are transmitted via the body transmission channel. The wake-up receiver 108 comprises means to detect whether the energy of the filtered signal exceeds an energy threshold level. When the energy threshold level is exceeded, the wake-up receiver 108 generates the internal wake-up signal 107 which is provided to the main receiver 106. As discussed previously, when the internal wake-up signal 107 is received by the main receiver 106, the main receiver 106 is configured into its operational mode. Thus, in periods of time that the main receiver 106 is in its sleep mode and no internal wake-up signal 107 is generated by the wake-up receiver 106, power is saved.

The second body coupled communication device 180 also comprises a couplers (not shown) and comprises a transmitter (not shown) which is configured to transmit signal via the couplers and, thus, via the body transmission channel. When the second body coupled communication device 180 wants to initiate communication via the body transmission channel, the second body coupled communication device 180 transmits external wake-up signals via the body transmission channel 160. External wake-up signals are, for example, sinusoidal waves at a wake-up frequency and these sinusoidal waves may be transmitted during wake-up periods of time. For example, during 100 milliseconds a signal at 100 kHz may be transmitted. For example, during consecutive periods of time, every first 0.5 second a signal is transmitted at 150 kHz. In an embodiment, the external wake-up signal is a square wave of the wake-up frequency.

For example, micro-preambles may be transmitted, such as described in US patent application publication US2012/0033584.

In an optional embodiment, the predefined spectral range, which is the spectral range within which external wake-up signals are transmitted/received, is below the frequency or frequencies at which the normal data communication is performed via the body transmission channel. For example, the normal data communication from the second body coupled communication device 180 to the first body coupled communication device 100 is performed at, for example, a single carrier frequency of 10 MHz, or, for example, at a plurality of carrier frequencies in the range from 1 MHz to 50 MHz. The external wake-up signals are transmitted at, for example, 100 kHz, and thus, the predefined spectral range may be from 90 kHz to 110 kHz.

In an embodiment, the wake-up receiver 108 may analyze the amplitude of the received external wake-up signals to detect whether their energy exceeds the energy threshold level. However, this may result in false wake-up detections when noise or interference of a relatively high amplitude level is received. Thus, in another embodiment, the wake-up receiver determines during an interval of time whether the total amount of received energy received in the predefined spectral range exceeds the energy threshold level. Thus, the filtered signal is analyzed to determine the total amount of energy received during the interval of time and the total amount of received energy is compared to the energy threshold level and, if the total amount of received energy is larger than the energy threshold level, the internal wake-up signal 107 is generated and provided to the main receiver 106.

An exemplary embodiment of the main receiver 106 may be found in document WO2010/049842, however, the main receiver of that document must be further adapted to operate in the operational mode or in the sleep mode. This may be done by the skilled person by providing an on/off circuit to the main receiver of that document which cuts off power to the modules of the main receiver when the main receiver must operate in the sleep mode and which provides power to the modules of the main receiver when the main receiver has to operate in the operational mode.

Further details of first body coupled communication device 100 and in particular the wake-up receiver 108 are given in European patent application 13162253 of the same applicant, and included herein by reference.

Device 100 uses dedicated wake-up circuitry 108 that is operational in stay-by mode while the main receiver 106 is in sleep mode. The wake-up circuitry detects an external wake-up signal from second device that wants to start up the main BCC transceiver. When wake-up receiver 108 has detected the external wake-up signal, it generates an internal wake-up signal to wake other circuitry of device 100, in particular, main receiver 106. To reduce power consumption it is preferred that wake-up receiver 108 is sensitive only to a narrow bandwidth, and thus that the external wake-up signal has a narrow bandwidth. Narrow band implementation of the wake-up circuitry is attractive due to the low power requirements.

Signal detection in a very narrow frequency band is inherently power efficient. This efficiency comes from the fact that any signal detection requires some signal to noise ratio (SNR). In turn the SNR is very much dependent on the bandwidth in which the noise is playing a role, as the total noise for SNR calculation is the integral of the noise in the bandwidth of interest. The smaller the bandwidth less noise is integrated. The noise directly relates to power consumption because the noise in MOS devices can be reduced at the expense of higher bias currents and chip area.

If the bandwidth to which wake-up receiver 108 is too is narrow, the system suffers more from process spread. If the clock frequency of transmitter 108 and the filter frequency of wake-up receiver 108 are not sufficiently close to each other, then the external wake-up signal may fall outside the bandwidth of wake-up receiver 108 and device 100 may fail to wake-up. This problem will especially occur if an oscillator of device 100 is voltage controlled oscillator, without a crystal. The production variability could be minimized by design, but at a high cost in terms of chip area and higher current consumption. Variation in voltage controlled oscillators may be as large as 20% for a simple design; even for an advanced design it is hard to get this variation under 5%.

There is therefore a need for a first body-coupled communication device adapted to receive signals via a body transmission channel which can synchronize with a second body-coupled communication device over the body transmission channel. The synchronization that is achieved between two body-coupled communication devices may be used to make the bandwidth of a wake-up receiver narrower.

Figure 3A:
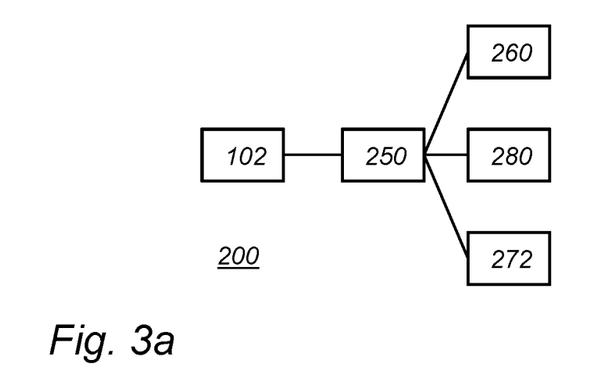
FIG. 3a shows a first body coupled communication device 200.

FIG. 3a shows a first body coupled communication device 200.

First device 200 comprises couplers 102 arranged to receive a body-coupled signal from at least a second body-coupled communication device, e.g., device 180, over the body transmission channel 160, the body transmission channel 160 being formed by a body of a user 150 when the body is in the direct vicinity of the couplers 102. Couplers 102 typically comprise two electrically conductive plates, e.g., metal plates.

First device 200 comprises a band-pass filter 250 and a detection circuit 260. Band-pass filter 250 and detection circuit 260 are arranged in first device 200 so that detection circuit 260 receives the body-coupled signal from couplers 102 via band-pass filter 250 so that the signal is filtered by a band-pass filter, and so that detection circuit 260 receives the filtered body-coupled signal.

The detection-circuit is arranged to detect an external synchronization signal in the filtered body-coupled signal.

It is a problem when manufacturing body-coupled communication devices, like the first and second device, that the frequency to which components like signal generators, clocks, and band-pass filters are not precisely tuned to each other. Natural process variation during production causes a spread in the exact pass-band to which band pass filter 250 is sensitive, or to the frequency of signals produced by and received from the second device.

First device 200 comprises a tuning circuit 280 arranged to tune a tunable filter frequency of band-pass filter 250 in dependency of a frequency of the detected synchronization signal.

Band-pass filter 250 may use one of several designs. For example, band-pass filter 250 may be resonator, say an RC resonator or a gyrator resonator.

The synchronization signal may be an external wake-up signal. In this case, detector 260 may be arrange to also generate an internal wake-up signal with which a further circuit of first device 200 may be switched from sleep to operation mode, typically a receiver, but possibly other circuits say a sensor. In this way, detection circuit 260 is at the same time a wake-up circuit. First device 200 may be used in the system of FIG. 2, e.g., as device 100.

The wake-up circuitry of first device 200, e.g., detection circuit 260, may be always on when the user enables the device (i.e. it does not have a sleep-mode). The wake-up circuitry 260 is arranged to detect a wake-up signal from another device that wants to start up the main receiver of first device 201.

First device 200 may also be configured for a dedicated synchronization signal. The synchronization signal may be the same frequency as the wake-up signal, but say, of longer duration to allow better tuning We will assume for the embodiments described below that the synchronization frequency is the same as the wake-up frequency, and that the tuning circuit 280 is arranged to tune the tunable filter frequency towards a frequency of the detected synchronization signal. In this case the detection circuit 260 may be arranged to detect both the synchronization signal as the wake-up signal, and even to produce an internal wake-up signal in both cases.

It is preferred that band-pass filter 250 has a narrow pass-band. Filtering for a narrow-pass band requires less energy, also the detection circuit will receive less noise, and thus fewer false wake-ups will occur.

First device 200 comprises a synchronization-indicator 272. The synchronization-indicator 272 is arranged to indicate a level of synchronization between first device 200 and the second device 180. The band-pass filter 250 is arranged to filter the received body-coupled signal depending on the synchronization level. The band-pass filter is arranged to allow passage of frequencies in a frequency-interval around a tunable filter frequency, wherein the frequency-interval is narrow if the synchronization-level is high and wherein the frequency-interval is broad if the synchronization-level is low. Moreover, the tuning circuit 280 is arranged to increase the synchronization-level, if it has tuned the tunable filter frequency towards a frequency of the detected synchronization signal. For example, synchronization-indicator 272 may store the synchronization-level in a storage, such as an electronic memory, a flip-flop, and the like.

Synchronization-indicator 272 may be implemented as an electronic memory. For example, synchronization-indicator 272 may be a non-volatile memory such as flash memory.

Synchronization-indicator 272 may even be implemented as volatile memory, for example as part of a wake-up circuit. The latter option may be cheaper; however it requires that memory to remain powered to keep the synchronization level. In an embodiment synchronization-indicator 272 is arranged so that synchronization-indicator 272 indicates a lowest synchronization level, upon power-loss.

Synchronization-indicator 272 may be implemented in various ways. For example, the synchronization-indicator may be a flag indicating either synchronized or unsynchronized. In this case, two frequency-interval sizes are associated with the two states of the flag, i.e., a narrow frequency-interval size for the synchronized setting and a broad frequency-interval size with the unsynchronized setting. For example, the broad and narrow size may be configured in band-pass filter 250. Band-pass filter 250 is arranged to have a frequency-interval of narrow frequency-interval size if the synchronization-indicator is synchronized and to have a frequency-interval of broad frequency-interval size if the synchronization-indicator is unsynchronized.

Synchronization-indicator 272 may also be arranged to have more than 2 possible different values. For example, synchronization-indicator 272 may be arranged with multiple bits which together indicate the synchronization level, say as a binary value. For example, synchronization-indicator 272 could be configured with 2 or 3 or more, say 8 or more, say 16 bits. The bits could hold an integer value. Synchronization-indicator 272 could also be arranged to hold a so-called float value.

The band-width of the broad and narrow settings depends on the variability in the system. As an example, using a low-quality VCO, with a setting of 10 Mhz, the broad-band width may be 2 Mhz, and the narrow band-width about 10 kHz. For a high quality VCO, the broad-bandwidth may be 500 kHz. In an embodiment the frequency interval size of the lowest synchronization level is at least 20 times as large as the frequency interval size of the highest synchronization level.

Tuning circuit 280 may be arranged to increase synchronization-indicator 272 each time is has improved the tuning, say an increase by 1. Tuning circuit 280 may also be arranged to encode in synchronization-indicator 272 a number indicating the quality of the achieved tuning For example, synchronization-indicator 272 may increase synchronization-indicator 272 with a first number if the tuning was successful and with a second number, larger than the first number if the tuning was more successful.

Generally, if synchronization-indicator 272 has reached a maximum value, it need not further be increased; an attempt to further increasing synchronization-indicator 272 will cause it to remain at the same value.

Instead of increasing synchronization-indicator 272, tuning circuit 280 may also compute an absolute number indicating the quality of tuning and overwrite synchronization-indicator 272 with the absolute number.

In principle, the synchronization level could be kept as an analog value; although possible, this is considered less practical.

Band-pass filter 250 may be configured with multiple frequency-interval sizes, i.e., bandwidth. This is especially useful if the number of different levels that synchronization-indicator 272 can take is relatively small. For example, if synchronization-indicator 272 is implemented by a number of bits, say 2, 3, or 4, then band-pass filter 250 may be configured with 4, 8, 16 or 32 different frequency-interval sizes. The frequency size decreases as synchronization level increases. In an embodiment, synchronization-indicator 272 directly holds the frequency-interval size. In this case, synchronization-indicator 272 is reduced in value to indicate that the level of synchronization has increased.

Instead of using a number of predefined frequency-interval sizes, band-pass filter 250 may also be arranged to compute the frequency-interval size from the synchronization-level. For example, a function may map synchronization-level to frequency-level size. Practically, this function is strictly a decreasing function.

During operation first device 200 may operate as follows. When first device 200 is powered-up for the first time, synchronization-indicator 272 is arranged with the lowest synchronization-level; say synchronization-indicator 272 may contain 0; if synchronization-indicator 272 is a flag, the flag may indicate unsynchronized. At this point first device 200 may enter sleep-mode, although this is not necessary. Later the second device sends a synchronization signal over body transmission channel 160. Couplers 102 receive the signal. Band-pass filter 250 then proceeds to filter the received signal. Band-pass filter 250 retrieves the synchronization level from synchronization-indicator 272. At this point the level indicates no synchronization. Accordingly, band-pass filter 250 proceeds to apply a band-pass filter to the received signal that has a broad bandwidth, i.e., a large frequency-interval size. The detection circuit now receives a filtered signal, and detects the synchronization signal (possible embodiments can be found herein and/or in the above cited patent application). If first device 200 is sleeping, detection circuit 260 can generate an internal wake-up signal to wake a further circuit. For example, tuning circuit 280 is woken from sleep to operational mode by the internal wake-up circuit. Tuning circuit 280 proceeds to tune band-pass filter 250 to the received signal. For example, a center frequency of the pass-band of band-pass filter 250 is moved towards a frequency of the received signal. The latter frequency, may be a principal frequency, say the lowest or strongest frequency. A synchronization signal will typically have a dominant frequency, e.g., because the signal is a sine or square waveform.

Tuning circuit 280 now moves synchronization-indicator 272 to a higher level of synchronization. If the synchronization signal is sufficiently long for full synchronization and/or the synchronization-indicator 272 is a flag, tuning circuit 280 may immediately move synchronization-indicator 272 to its highest level. If synchronization-indicator 272 is not a flag, tuning circuit 280 can move synchronization-indicator 272 to a point intermediate between no synchronization and full synchronization.

At some point first device 200 will proceed to sleep again. A next time couplers 102 receive a signal band-pass filter 250 will apply a band-pass filter with a smaller bandwidth. If the signal has the same frequency as the synchronization filter, the band-pass filter is well-tuned to allow the signal to pass. Other frequencies are blocked. Band-pass filter 250 uses less power in this mode than in the broad interval mode. Likewise, other parts of the wake-up in FIG. 4*d*. also use less power, in narrow interval mode.

Signal detection may be done in a very narrow frequency bandwidth. First device 200 may use very sharp band-pass filters. The band-pass filters can by realized by so-called resonators. By using resonator filters with sharp frequency characteristics a very selective wake-up receiver is made. Due to the very narrow frequency band the receiver achieves a required SNR with very low power.

In an embodiment, band-pass filter 250 comprises a first band-pass filter and a second band-pass filter. Band-pass filter 250 can select which one to use on the basis of synchronization-indicator 272. Neither the first nor second band-pass filter needs to have a configurable frequency interval size. The first band-pass filter is arranged with a broad frequency interval size, and may even have a fixed center frequency. The second band-pass filter has a tunable filter frequency, but may have a fixed narrow frequency interval size. A frequency interval, i.e. a band-width, may be defined as an interval of frequencies where the gain of the filter is less than a pre-determined level, say less than −3 dB.

If synchronization-indicator 272 is not a flag, the tuning may be iteratively improved. This is particularly useful if the wake-up and synchronization are performed on relatively short signals. For example, one may use only the preamble of data packets both as synchronization signal and as wake-up signal.

Figure 3B:
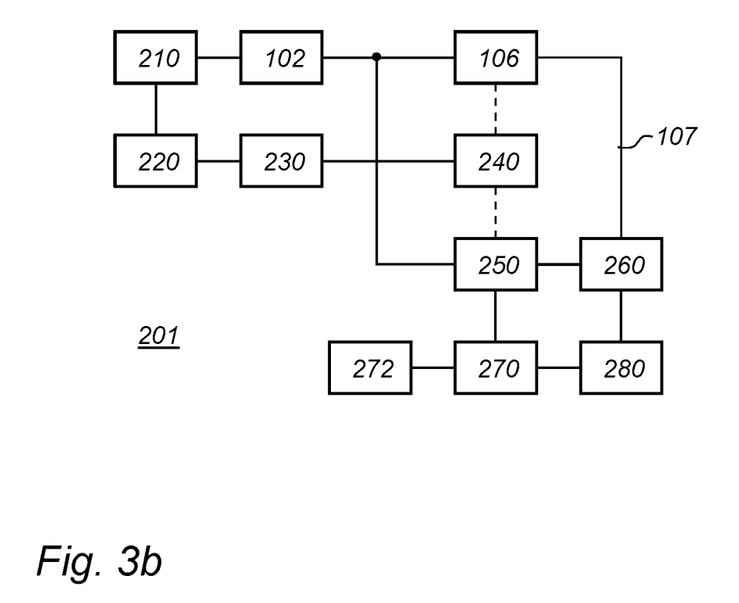
FIG. 3b shows a first body coupled communication device 201.

FIG. 3*b* shows a first body coupled communication device 201. First device 201 is a refinement of the embodiment described with reference to FIG. 3*a*. The additional features of first device 201 are optional features. An optional feature disclosed below may be incorporated in first device 200 if desired.

Like first device 200, first device 201 comprises couplers 102, a band-pass filter 250, a detection circuit 260, and a synchronization-indicator 272. Like in first device 200, as synchronization-indicator 272 indicates a higher level of synchronization, band-pass filter 250 applies a smaller bandwidth. As tuning circuit 280 improves the tuning of band-pass filter 250 with an external synchronization signal, synchronization-indicator 272 is increased towards a higher level of synchronization.

First device 201 further comprises a main receiver 106. Main receiver 106 is optional, for example, a body coupled device could be a sensor, arranged to obtain one or more sensor values whenever it is woken by a wake-up circuit. The sensor values may be stored and read out using a further communication means, e.g., RF communication, or attaching a wire to the sensor.

Main receiver 106 is coupled to the couplers 102 and arranged to receive data via signals transmitted via the body transmission channel 160, e.g., from a second device like device 180. The main receiver 106 is arranged to operate in a sleep mode and to operate in an operation mode, and to switch from sleep mode and to operate in an operation mode in response to the internal wake-up signal 107. The internal wake-up signal 107 may be generated by detection circuit 260 upon detection of a synchronization signal or external wake-up signal.

Detection circuit 260 may be further arranged to detect an external wake-up signal in the filtered body-coupled signal, and arranged to generate an internal wake-up signal 107 upon said detection. The synchronization and external wake-up signal may be the same type of signal, i.e., having the same frequency spectrum and duration. The synchronization and external wake-up signal may be different signals; for example, the synchronization signal may be longer, say twice as long or more than the external wake-up signal.

First device 201 comprises an electronic oscillator 230 to generate a clock signal. Also oscillator 230 may be woken by the internal wake-up signal. In this case, band-pass filter 250 and detection circuit 260 work using asynchronous circuits. Interestingly, the synchronization system of first device 200 and first device 201 allow first device 201 to be a relatively cheap design, with comparatively large manufacture variation. In an embodiment oscillator 230 is a voltage controlled oscillator (VCO). In an embodiment, first device 201 and in particular oscillator 230, does not comprise a crystal. If first device 201 comprises oscillator 230, then main receiver 106 may be synchronized by the clock signal. In an embodiment, band-pass filter 250 and detection circuit 260 are asynchronous circuits and main receiver 106 is a synchronous circuit.

It is of advantage that the band-pass filter of first device 201 is synchronized with the frequency of the external wake-up signals used by a further device. This allows a narrower pass-band in band-pass filter 250. Interestingly, first device 201 may comprise a synchronization circuit 240 to further synchronize first device 201 with a second device 180. Synchronization circuit 240 is optional. Synchronization circuit 240 is arranged to synchronize the oscillator of the first device with the second device.

Synchronizing the clock frequency of first device 201 improves reception of signals; furthermore it improves external reception of signals generated by first device 201. The latter is especially important for wake-up signals generated by first device 201 as the latter may be filtered by band-pass filters of the kind of band-pass filter 250.

Synchronizing oscillator 230 may be done in different ways. Two options are described below, and are indicated in FIG. 3b by dashed lines.

A first way for synchronization circuit 240 is to tune the oscillator to a frequency corresponding to the filter frequency to which tuner 280 has tuned the band-pass filter. For example, a signal may be generated of a frequency that should correspond to the synchronization frequency, which is lead through band-pass filter 250 and a detection circuit possibly even detection circuit 260 itself. Oscillator 230 can then be tuned so that the response of detection circuit 260 is maximal, when this happens the oscillator 230 is running on a frequency that is close or equal to the clock frequency used to generate the external signal, e.g., a clock of device 180. Note that it is not necessary that the clock frequency equals the synchronization frequency. The signal generation may use a divider to generate a frequency at any lower frequency than the clock frequency. Note, that due to process spread using oscillator 230 to generate a signal of any particular frequency will not result in a signal with has exactly that frequency or which has the same frequency as externally received signals. However, after synchronization by synchronization circuit 240 at least the clocks in first device 201 and second device 180 are running at the same frequency.

The wake-up signal helps the devices to communicate in a more controlled and reproducible manner. For narrow band communication we need the frequency of the two devices to be very close.

A second way to synchronize is to arrange the synchronization circuit 240 to tune the oscillator to a frequency of the signal received by the main receiver from the couplers. As main receiver 106 is used to receive data in a signal, the same data signal may be used to synchronize the clocks.

First device 201 may comprise a main transmitter 210. The main transmitter 210 is also coupled to couplers 102; the couplers 102 are further arranged to transmit a body-coupled signal over the body transmission channel 160 to the second device. Main transmitter 210 may be used to send data to other devices over the body network. For example, these may be sensor data. In addition, wake-up signal generator 220 may also comprise a wake-up signal generator 220 to generate a wake-up signal. The wake-up signal is connected to the oscillator 230, and may comprise a divider to generate the correct frequency. If wake-up signal generator 220 is used, the receiving device, e.g., device 180 need not be in operation mode all the time, but may also sleep.

The main transmitter may be used to upload data from the first device 201 to a second device, say to upload sensor data. If the second device is always on, then no wake-up signal is needed. If a wake-up signal is needed, then first device 201 may comprise an optional wake-up signal generator 220. The wake-up signal generator 220 is coupled to the electronic oscillator and arranged to generate an external wake-up signal having a wake-up frequency. The wake-up frequency may be the same as the synchronization frequency. A signal of this wake-up frequency may be obtained by dividing the clock signal. The signal may be a sine or square wave signal. The main transmitter 210 is arranged to transmit the external wake-up signal data over the body transmission channel 160. Next, the main transmitter 210 may proceed to upload the data to the second device.

To detect the synchronization and/or wake-up signal, first device 201 may comprise an energy reception level detector (not separately shown) arranged to detect whether a total amount of the energy in the filtered body-coupled signal exceeds an energy threshold level. For example, after filtering by band-pass filter 250 the signal may be rectified and integrated for a period. The energy reception level detector may be comprised in detection circuit 260. The energy reception level detector may also be used by tuning circuit 280.

One way to perform the tuning is as follows. The band-pass filter 250 may comprise an input for receiving one or more parameters determining the tunable filter frequency and a frequency-interval size of the frequency interval. First device 201 may comprise a parameter store 270 storing the parameters. The tuning circuit may be arranged to adapt the one or more parameters so-that the frequency-interval size is decreased, and the tunable filter frequency is changed to increase the total amount of energy in the body-coupled signal in the decreased frequency-interval.

For example band-pass filter 250 may comprise programmable feedback capacitances to realize programmable centre frequency of the resonators. Band-pass filter 250 may also have programmable sensitivity, i.e., a programmable frequency interval size.

For example, in an embodiment, the synchronization signal may be detected. At this point the band-pass filter is in a broadband mode. Tuning circuit 280 decreases the filter interval size and obtains the amount of energy using this filter setting. Next tuning circuit 280 moves the tunable filter frequency up and/or down and obtains the energy using these filter setting. Tuning circuit 280 then moves the tunable filter frequency to the position of the tunable filter frequency that gave the highest amount of energy.

In an embodiment, tuning circuit 280 is configured to move the tunable filter frequency by an amount that decreases as the synchronization level increase, say according to a function or a table.

In an embodiment, parameter store 270 comprises multiple parameter sets. For example, a tuned parameter set which is improved by tuning circuit 280 and a fixed parameter set. The fixed parameter set represent the broad setting of band-pass filter 250. First device 201 may be configured with a reset input to reset device 201 to use to the broad setting of band-pass filter 250, and to reset, the tunable parameter set. For example, the tunable parameter set may be reset by overwriting it with zero or with a copy of the fixed parameter set.

In an embodiment, couplers 102, band-pass filter 250, and detection circuit 260 are implemented as asynchronous circuits, and tuning circuit 280 and synchronization-indicator 272 as synchronous circuits. Typically, the device 201 (except the couplers) may, in whole or in part, be implemented as an integrated circuit. In particular one may implements as an integrated circuit: band-pass filter 250, tuning circuit 280, synchronization-indicator 272, detection circuit 260, parameter store 270, synchronization-indicator 272, oscillator 230, wake-up signal generator 220, and main transmitter 210. All or part of first device 201 may be implemented as programmable logic, e.g., as field-programmable gate array (FPGA). Device 201 may be implemented, in whole or in part, as a so-called application-specific integrated circuit (ASIC), i.e., an integrated circuit (IC) customized for their particular use. The synchronous circuits may be a processor circuit and storage circuit, the processor circuit executing instructions represented electronically in the storage circuits. The circuits may also be FPGA, ASIC or the like.

The device 201 may comprise a microprocessor (not shown) which executes appropriate software stored at the device 201; for example, that software may have been downloaded and/or stored in a corresponding memory, e.g., a volatile memory such as RAM or a non-volatile memory such as Flash or ROM (not shown). For example, tuning circuit 280 may execute a tuning algorithm, e.g., as described above, under control of software.

Figure 4A:
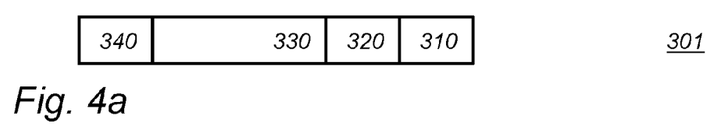
FIGS. 4a and 4b show a data packet.

FIG. 4a shows a data packet 301 that may be sent from the second device 180 to first device 200 or first device 201. Time increases from the right side to left in figures 4a-4d. That is, the parts of a packet shown most to the right are received first, and the parts shown most to the left are received last.

Data packet 301 comprises a preamble 310, a start-of-packet indication 320, a data payload 330, and an end-of-packet indication 340. (Parts 320 and 340 are optional). The transmitter (TX), say device 180, starts the main communication with a preamble signal 310. The preamble is a signal with pre-determined data-independent spectral content. For example, preamble 310 may be a square wave signal which can be generated by dividing the signal from the clock, say a local voltage controlled oscillator (VCO) of the transmitter. If the preamble signal is a square wave, the main frequency component of the signal has a very narrow bandwidth corresponding to the first harmonic of the square wave.

A preamble signal may be used at the start of a transmission packet as a signal that enables synchronization between two BCC transceivers. On the receiver (RX) side an (e.g.) VCOrx is synchronized with the frequency used in the preamble signal via a dedicated frequency synchronization circuitry. After the RX is in synch with TX the actual data reception can start. The preamble is already present in the transmitted signal because it is required for RX to TX synch, and may be re-used as a wake-up signal.

In an alternative, embodiment the local VCO is synchronized through the main receiver to the transmission signal. Then a synchronization circuit may tune the band pass filter from the synchronized VCO. For example, the first device may comprise a signal generator arranged to generate a synchronization signal having the synchronization frequency using the tuned VCO, and a tuning circuit arranged to tune the tunable filter frequency of the band-pass filter towards a frequency of a synchronization signal locally generated by the signal generator.

Figure 4B:
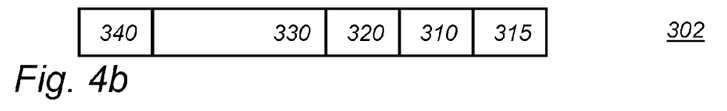

FIG. 4b shows data packet 302. Data packet 302 is the same as packet 301 but has an additional wake-up-signal 315 before the preamble 310.

In this embodiment a dedicated, wake-up signal 315, with specific frequency, is used that is send before the synchronization preamble 310. Using a dedicated wake-up signal 315 allows a further decrease of the power consumption of the wake-up mechanism. The power saving will be realized if the wake-up operates at lower frequency than the main transceiver. Lower the frequency, higher the energy saving can be achieved. The choice of a concrete wake-up frequency also depends on the desired speed of the wake-up that decreases with the decrease of the wake-up signal frequency. When packets of type 302 are uses the synchronization signals and wake-up signals are the same signal.

In an embodiment, the wake-up frequencies is between $1/10$ and $1/100$ of the main transmitter frequency (TRX). If the wake-up frequencies is too low, relative to the TRX frequency, the wake-up requires too much time.

With a dedicated wake-up signal the power consumption of the wake-up mechanism may be further reduced. The power saving may be obtained if the wake-up operates at lower frequency than the main transceiver. Lower the frequency, the higher the energy saving that can be achieved.

The choice of a concrete wake-up frequency may also depend on the desired speed of the wake-up that decreases with the decrease of the wake-up signal frequency; a higher frequency allows a lower response time.

Figure 4C:
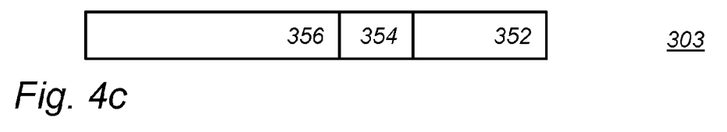
FIG. 4c shows a synchronization packet.

FIG. 4c shows a synchronization packet 303. A synchronization packet is sent from a second device, like device 180, to a first device to synchronize the band-pass filter of the first device, and optionally a clock of the first device.

Synchronization packet 303 comprises first an (optional) synchronization wake-up 352, and an (optional) synchronization identifier 354. Wake-up 352 wakes a synchronization circuit, such as a tuning circuit 280. The synchronization wake-up may be the same as the preamble used for regular data communication. A main receiver may be used to receive the identifier.

The synchronization identifier 354 is a special identifier to indicate to the first device that this is a synchronization packet. Using identifier 354 reduces the chance that the first device might synchronize on a spurious signal. First device 201 may comprise appropriate means to detect and verify the identifier, e.g., the identifier may be received with the main receiver, and a processor may detect and verify the identifier. The identifier may be a magic number, say of 32 bits (more or fewer bits is also possible).

The wake-up signal 352 may be the same signal, i.e., the same spectrum, i.e., the same main frequency as the synchronization signal. The wake-up signal 352 may also have a different frequency; however in any case the duration of synchronization signal 356 is longer, say more than twice as long as the wake-up signal 352. This allows more time for the tuning FIG. 4d shows a signal path 360 that may be used in first device 200 or first device 201.

Figure 4D:
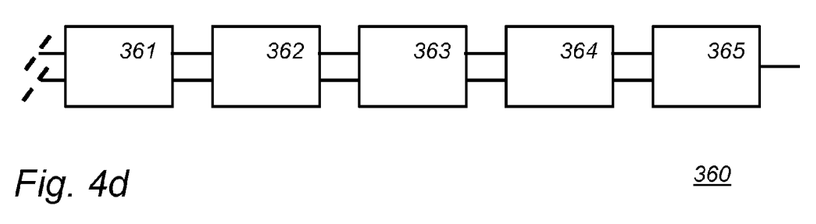
FIG. 4d shows a signal path.

At the far left of FIG. 4d, the device receives a BCC signal from capacitive plates. An amplifier 361, such as a low noise input amplifier (LNA), may be used to amplify the signal. The input amplifier may also match the impedance requirements of the BCC. The coupling to the input is capacitive and the input of the amplifier may be biased.

A band-pass filter 362 filters it with sharp band-pass filter (say a resonator). The filter is tuned to detect the preamble/synchronization/wake-up signals. In order to increase further the robustness to interferences the energy in the pass-band of the resonator may be accumulated in two steps. First a rectifier 363 takes the absolute value of the signal; then the signal is integrated by an integrator 364 for several periods of the signal. At the moment the integrator output signal reaches a threshold level of a comparator 365 a wake-up signal may be generated.

For example, band-pass filter 362 may be part of band-pass filter 250; rectifier 363, integrator 364, and comparator 365 may be part of detection circuit 260. Amplifier 361 may be positioned between couplers 102 and band-pass filter 250. Amplifier 361 may also be integrated with band-pass filter 250.

The preamble of a data packet may serve both as wake-up and as synchronization signal. For example, in an embodiment of a first body-coupled communication device adapted to receive signals via a body transmission channel 160, the first device comprising couplers 102 arranged to receive a body-coupled signal from at least a second body-coupled communication device over the body transmission channel 160, the body transmission channel 160 being formed by a body of a user 150 when the body is in the direct vicinity of the couplers 102, a main receiver 106 coupled to the couplers 102 and arranged to receive data via signals transmitted via the body transmission channel 160, the data signals encoding a data packet, the data packet having a preamble and a data payload, the preamble being received before the payload, the main receiver 106 being arranged to operate in a sleep mode and to operate in an operation mode, and to switch from sleep mode and to operate in an operation mode in response to an internal wake-up signal, a synchronization-indicator 272 arranged to indicate a level of synchronization between the first device and the second device, a band-pass filter 250 arranged to filter the received body-coupled signal depending on the synchronization level, the band-pass filter being arranged to allow passage of frequencies in a frequency-interval around a tunable filter frequency, wherein the frequency-interval is narrow if the synchronization-level is high and wherein the frequency-interval is broad if the synchronization-level is low, a detection-circuit 260 arranged to detect the preamble of the data packet in the filtered body-coupled signal, and to generate the internal wake-up signal, and a tuning circuit 280 arranged to tune the tunable filter frequency towards a frequency of the detected preamble, and arranged to increase the synchronization-level.

Figure 5A:
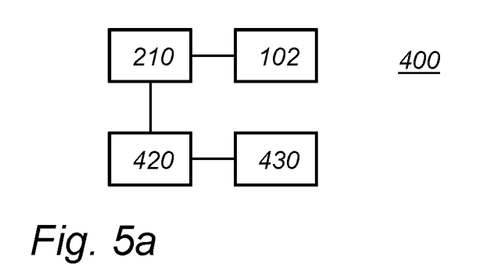
FIG. 5a shows a second body coupled communication device 400.

FIG. 5a shows a second body coupled communication device 400. Device 400 may be used as a second device together with the first devices 200 or 301. Device 400 may also be used as device 180. Second device 400 comprises couplers 102, e.g., of the type described above, a main transmitter 210 coupled to couplers 102 for sending body coupled signals from the second device to the first device.

Second device 400 comprises an oscillator 430 for generating a clock signal. The oscillator may be of a relatively cheap design, say a voltage controlled oscillator (VCO), in particular without a crystal. Oscillator 430 may also be a more expensive design comprising a crystal. Interestingly, by providing second device 400 with a crystal improves the clocks of all devices, as they can synchronize to the clock, as described above. However, even if the clock of second device 400 does not contain a crystal, the first devices will synchronize to the second device. In some systems, the second device is called a 'master' device and the first devices are called 'slave' devices. There may be multiple first devices together with one second device.

Second device 400 comprises a signal generator 420. Signal generator 420 is coupled to the electronic oscillator and arranged to generate an external synchronization signal having the synchronization frequency and to transmit the synchronization signal to the first device. Signal generator 420 may also be used to generate a wake-up signal. By sending the synchronization signal, the first device(s) can synchronize their band-pass filter, and optionally their clock to the frequency used by signal generator 420. Using second device 400 thus allows a narrower pass band in the band pass filters of the first devices; this in turn leads to lower energy consumption.

Figure 5B:
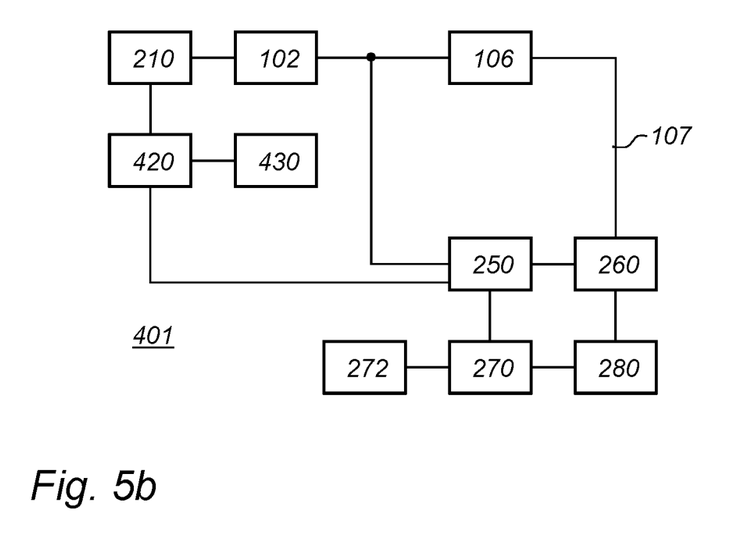
FIG. 5b shows a second body coupled communication device 401.

FIG. 5b shows a second body coupled communication device 401. Second device 401 is more refined than device 400 and contains more optional features. Second device 401 may comprise a detection circuit 260. Detection circuit 260 is used in the second device to detect a wake-up signal in a received body coupled signal. Upon detecting the wake-up signal, detection circuit 260 generates an internal wake-up signal 107 to wake a further circuit of second device 401, say a main receiver 106. The wake-up signal received by second device 401 may be the same as the wake-up signals send by signal generator 420, and the same as those produced by wake-up signal generator 220.

The second device may comprise a band-pass filter 250 arranged to filter the received body-coupled signal, the band-pass filter being arranged to allow passage of frequencies in a frequency-interval around a tunable filter frequency. The band-pass filter is arranged between couplers 102 and detection circuit 260 to filter the signal. This reduces false-wake ups.

This band-pass filter may have the same problem as band-pass filter 250 in first device 200; on the one hand the filter must be broad to account for process variations and to avoid filtering out genuine wake-up signals, on the other hand the filter must be narrow to reduce power consumption.

Interestingly, second device 401 comprises a tuning circuit 280 arranged to tune the tunable filter frequency of the band-pass filter towards a frequency of a synchronization signal locally generated by the signal generator 420 of the second device. Thus second device 401 synchronizes its band-pass filter using the signal that is sent out to synchronize and/or wake the first devices. Thus second device 401 ensures that at least itself would be woken by the wake-up signals that it sends out. As a result both the first and second devices synchronize to the same signal; this will improve wake-up by the second device through signals of the first device.

The tuning circuit and band-pass filter may use a parameter store 270 to store filter parameters, in the same manner as first device 201. Second device 401 may comprise a synchronization-indicator 272 to indicate that the band-pass filter has synchronized with its own signal generator.

Second device 401 may comprises a main receiver, which may be woken by signal 107. The main receiver may receive data from a first device.

Figure 6A:
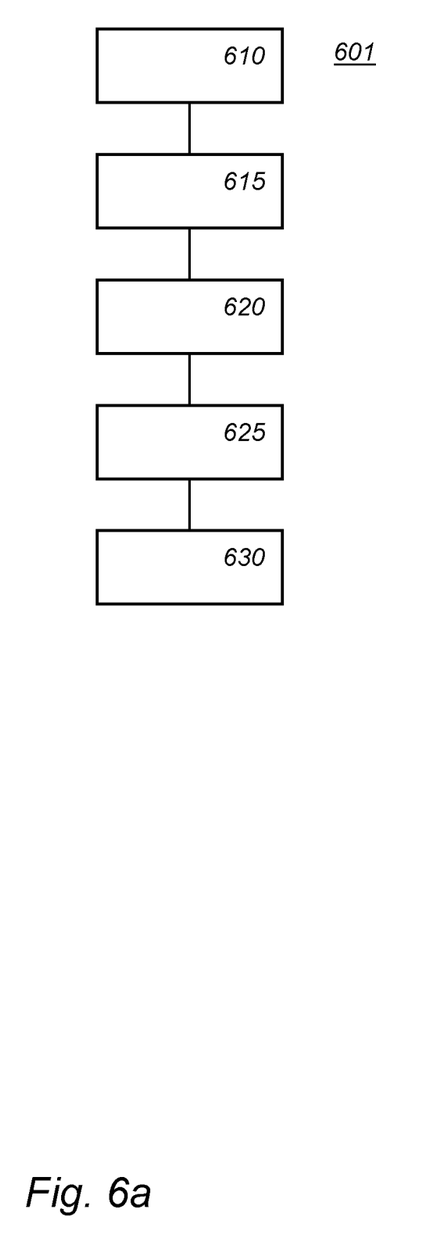
FIG. 6a shows a flowchart of a first method.

As an example, the oscillator could run at a clock frequency of 10 Mhz, the preamble, synchronization signal, and/or wake-up signal may be a fixed frequency signal, such as a sine or square wave. The frequency may be divided of the clock frequency. A lower frequency wake-up signal is more power-efficient, a high frequency gives a faster response. FIG. 6a shows in the form of a flow chart a first body-coupled communication method 601 adapted to receive signals via a body transmission channel 160. The method comprises: Receiving 610 a body-coupled signal from at least a second device over the body transmission channel 160.

Indicating 615 a level of synchronization between the first device and the second device.

Band-pass filtering 620 the received body-coupled signal depending on the synchronization level.

Detecting 625 an external synchronization signal in the filtered body-coupled signal, Tuning 630 the tunable filtering frequency towards a frequency of the detected synchronization signal, and arranged to increase the synchronization-level.

Figure 6B:
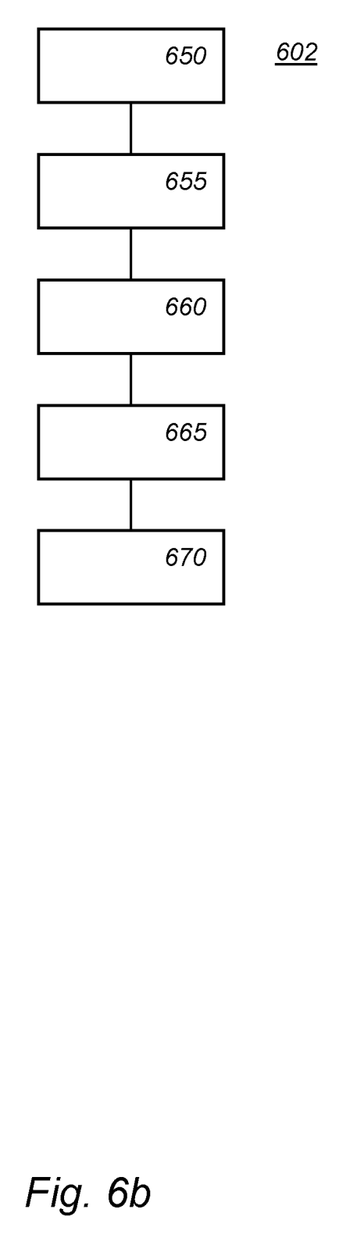
FIG. 6b shows a flowchart of a second method.

FIG. 6b shows in the form of a flowchart a second method 602 adapted to send signals via a body transmission channel. The second method comprises:

Transmitting 650 a body-coupled signal to one or more first devices over the body transmission channel 160, Band-pass filtering 660 a received body-coupled signal, the received body-coupled signal being received from a first devices over the body transmission channel (160), Generating 665 an external synchronization signal having the synchronization frequency, and transmitting the external synchronization signal to a first device. The method may comprise generating 655 a clock signal with an electronic oscillator, so that the generating 665 may use the clock signal.

Tuning 670 the tunable filter frequency of the band-pass filtering towards a frequency of a synchronization signal locally generated by the signal generator of the second device.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps may be executed, at least partially, in parallel. Moreover, a given step may not have finished completely before a next step is started.

A system method may comprise the first and second method.

The computer program may be provided in the form of a computer readable medium having a writable part comprising a computer program, the computer program comprising instructions for causing a processor system to perform a method of tuning a tunable filter frequency towards a frequency of the detected synchronization signal, according to an embodiment. The computer program may be embodied on the computer readable medium as physical marks or by means of magnetization of the computer readable medium 1000. However, any other suitable embodiment is conceivable as well. Furthermore, it will be appreciated that, the computer readable medium may be any suitable computer readable medium, such as a hard disk, solid state memory, flash memory, etc., and may be non-recordable or recordable. The computer program comprises instructions for causing a processor system to perform said method. In an embodiment, couplers 102, band-pass filter 250, detection circuit 260 are all implemented in hardware, e.g., as integrated or discrete circuits. Also tuning circuit 280 may be so implemented; however, tuning circuit 280 may operate on a processor under control of software. The computer program may be stored on a non-transient computer readable medium for performing a method according to an embodiment when said program product is executed on a computer.

Figure 7:
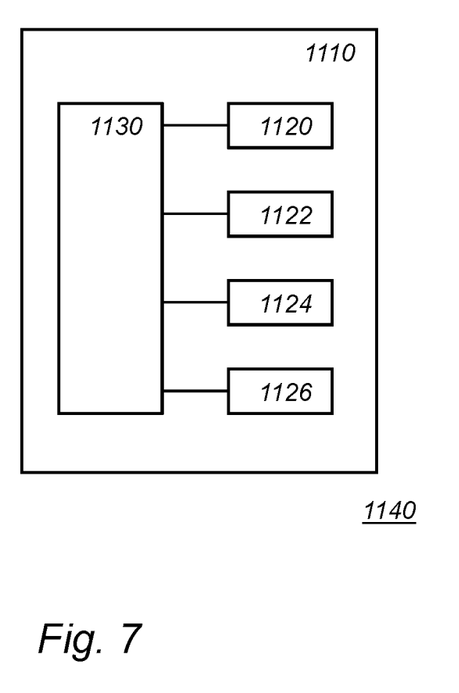
FIG. 7 shows a schematic representation of a processor system.

FIG. 7 shows a schematic representation of a processor system 1100 according to an embodiment. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention.

An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A body-coupled communication device for receiving signals via a body transmission channel, the device comprising:
   at least two couplers configured to receive a body-coupled signal from an other body-coupled communication device over the body transmission channel, the body transmission channel being formed by a body of a user when the body is in a direct vicinity of the couplers;
   a synchronization indicator configured to store a synchronization level between the device and the other device; and
   a band-pass filter configured to filter the body-coupled signal depending on the synchronization level, the band-pass filter configured to allow passage of frequencies in a frequency interval around a tunable filter frequency, wherein the frequency interval is narrow when the synchronization level is high and wherein the frequency interval is broad when the synchronization level is low.

2. The device as in claim 1, further comprising:
   a detection circuit configured to detect a synchronization signal in the filtered body-coupled signal, and
   a tuning circuit configured to tune the tunable filter frequency towards a frequency of the detected synchronization signal, and increase the synchronization level.

3. The device as in claim 2, wherein the detection circuit is further configured to detect an external wake-up signal in the filtered body-coupled signal, and generate an internal wake-up signal upon detection.

4. The device as in claim 3, further comprising:
   an oscillator configured to generate a clock signal,
   a synchronization circuit configured to synchronize the oscillator of the device with the other device;
   a main receiver coupled to the couplers and configured to receive data via signals transmitted via the body transmission channel, the main receiver being configured to operate in a sleep mode and an operation mode, and to switch from the sleep mode to the operation mode in response to the internal wake-up signal.

5. The device as in claim 3, comprising:
   an oscillator configured to generate a clock signal,
   a synchronization circuit configured to synchronize the oscillator of the device with the other device wherein the synchronization circuit is configured to tune the oscillator to a frequency of the signal received by the main receiver from the couplers.

6. The device as in claim 5, wherein the couplers are further configured to transmit the body-coupled signal over the body transmission channel to the other device, the device comprising:
   a wake-up signal generator coupled to the oscillator and configured to generate an external wake-up signal having a wake-up frequency,
   a main transmitter coupled to the couplers and configured to transmit the external wake-up signal over the body transmission channel.

7. The device as in claim 2, comprising an energy reception level detector configured to detect whether a total amount of energy in the filtered body-coupled signal exceeds an energy threshold level.

8. The device as in claim 1, further comprising:
   an oscillator configured to generate a clock signal,
   a synchronization circuit configured to synchronize the oscillator of the device with the other device.

9. The device as in claim 8, wherein the synchronization circuit is configured to tune the oscillator to a frequency corresponding to the filter frequency to which the band-pass filter is tuned.

10. The device as in claim 1, wherein the synchronization indicator is a flag indicating either synchronized or unsynchronized, having a narrow frequency interval size and a broad frequency interval size, respectively, the band-pass filter being configured to have a frequency interval of the narrow frequency interval size when the synchronization indicator is synchronized and to have a frequency interval of the broad frequency interval size when the synchronization indicator is unsynchronized.

11. The device as in claim 1, wherein the band-pass filter comprises an input for receiving one or more parameters determining the tunable filter frequency and a frequency interval size of the frequency interval,
   a tuning circuit being configured to adjust the one or more parameters so that the frequency interval size is decreased, and
   configured to adjust the tunable filter frequency increasing the total amount of energy in the body-coupled signal in the decreased frequency interval.

12. A body-coupled communication system comprising a first device and a second device,
   the first device comprising:
      at least two couplers configured to receive a body-coupled signal from the second body-coupled communication device over a body transmission channel, the body transmission channel being formed by a body of a user when the body is in a direct vicinity of the couplers;
      a synchronization indicator configured to store a synchronization level between the first device and the second device; and
      a first band-pass filter configured to filter the body-coupled signal depending on the synchronization level, the first band-pass filter configured to allow passage of frequencies in a frequency interval around a tunable filter frequency, wherein the frequency interval is narrow when the synchronization level is high and wherein the frequency interval is broad when the synchronization level is low;

the second device comprising:

at least two other couplers configured to transmit the body-coupled signal to the first device over the body transmission channel, the other couplers being further configured to receive the body-coupled signal from the first device over the body transmission channel;

a second band-pass filter configured to filter the body-coupled signal, the second band-pass filter being configured to allow passage of frequencies in a frequency interval around a tunable filter frequency;

a signal generator configured to generate a synchronization signal having the synchronization frequency, and to transmit the synchronization signal to the first device; and a tuning circuit configured to tune the tunable filter frequency of the band-pass filter towards a frequency of the synchronization signal locally generated by the signal generator of the second device.

13. A method for receiving signals by a device via a body transmission channel, the method comprising:

receiving a body-coupled signal from an other device over the body transmission channel, the body transmission channel being formed by a body of a user:

storing a synchronization level between the device and the other device, band-pass filtering the body-coupled signal depending on the synchronization level, the band-pass filtering being arranged to allow passage of frequencies in a frequency interval around a tunable filter frequency, wherein the frequency interval is narrow when the synchronization level is high and wherein the frequency interval is broad when the synchronization level is low.

* * * * *